(12) United States Patent
Weng et al.

(10) Patent No.: US 8,980,978 B2
(45) Date of Patent: Mar. 17, 2015

(54) POLYMERIC NANOCOMPOSITES AND PROCESSES FOR MAKING THE SAME

(75) Inventors: Weiqing Weng, Houston, TX (US); Anthony Jay Dias, Houston, TX (US); Caiguo Gong, Pearland, TX (US); Beverly Jean Poole, Houston, TX (US); Carmen Neagu, Friendswood, TX (US); Kriss Randall Karp, Copley, OH (US); Molly Westermann Johnston, Baytown, TX (US); James Richard Ayers, Highlands, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 462 days.

(21) Appl. No.: 11/630,083

(22) PCT Filed: Jun. 28, 2005

(86) PCT No.: PCT/US2005/022714
§ 371 (c)(1),
(2), (4) Date: Dec. 19, 2006

(87) PCT Pub. No.: WO2006/085957
PCT Pub. Date: Aug. 17, 2006

(65) Prior Publication Data
US 2007/0219304 A1  Sep. 20, 2007

Related U.S. Application Data

(60) Provisional application No. 60/585,629, filed on Jul. 6, 2004.

(51) Int. Cl.
*C08K 3/34* (2006.01)
*B82Y 30/00* (2011.01)
*C08L 21/00* (2006.01)
*C08L 23/16* (2006.01)

(52) U.S. Cl.
CPC ............ *C08K 3/346* (2013.01); *B82Y 30/00* (2013.01); *C08K 2201/011* (2013.01); *C08L 21/00* (2013.01); *C08L 23/16* (2013.01)
USPC ........................ 523/333; 524/445; 524/447

(58) Field of Classification Search
USPC ................... 524/445, 447; 523/333
See application file for complete search history.

(56) References Cited

U.S. PATENT DOCUMENTS

| | | | | |
|---|---|---|---|---|
| 5,576,372 A | * | 11/1996 | Kresge et al. | 524/442 |
| 5,698,624 A | * | 12/1997 | Beall et al. | 524/445 |
| 5,807,629 A | * | 9/1998 | Elspass et al. | 428/323 |
| 5,973,053 A | * | 10/1999 | Usuki et al. | 524/445 |
| 6,060,549 A | | 5/2000 | Li et al. | |
| 6,087,016 A | | 7/2000 | Feeney et al. | |
| 6,103,817 A | | 8/2000 | Usuki et al. | |
| 6,121,361 A | | 9/2000 | Usuki et al. | |
| 6,232,389 B1 | | 5/2001 | Feeney et al. | |
| 6,252,020 B1 | | 6/2001 | Kuo et al. | |
| 6,339,121 B1 | | 1/2002 | Rafailovich et al. | |
| 6,525,128 B2 | * | 2/2003 | Zanzig | 524/492 |
| 6,656,995 B2 | * | 12/2003 | Klendworth et al. | 524/445 |
| 6,849,680 B2 | * | 2/2005 | Knudson et al. | 524/445 |
| 2003/0039835 A1 | | 2/2003 | Tsai et al. | |
| 2003/0198767 A1 | | 10/2003 | Breed et al. | |
| 2005/0027057 A1 | * | 2/2005 | Dias et al. | 524/445 |
| 2007/0015853 A1 | * | 1/2007 | Weng et al. | 523/333 |
| 2007/0105998 A1 | * | 5/2007 | Gong et al. | 524/236 |

FOREIGN PATENT DOCUMENTS

| | | |
|---|---|---|
| EP | 1 321 489 | 6/2003 |
| KR | 2004/087705 | 10/2004 |
| WO | 01/72885 | 10/2001 |
| WO | WO 02/070589 | 9/2002 |
| WO | WO 02/100923 | 12/2002 |
| WO | WO 02/100935 | 12/2002 |
| WO | WO 02/100936 | 12/2002 |
| WO | WO 02/100938 | 12/2002 |
| WO | WO 2004/058874 | 7/2004 |

OTHER PUBLICATIONS

Wang et al "Preparation and Characterization of Rubber-Clay Nanocomposites" J. Appl. Scie, vol. 78, pp. 1879-1883 (2000).*

* cited by examiner

*Primary Examiner* — Vickey Nerangis

(57) ABSTRACT

The present invention relates to processes to produce nanocomposites. In particular, the invention relates to solution processes using organic solvents and mixtures of solvents to produce polymeric nanocomposites.

15 Claims, 6 Drawing Sheets

Example 5

Example 6

Example 7

Example 8

Example 9

Example 10

POLYMERIC NANOCOMPOSITES AND PROCESSES FOR MAKING THE SAME

CROSS REFERENCE TO RELATED APPLICATIONS

This application is a 371 National Stage Application of International Application No. PCT/US2005/022714, filed Jun. 28, 2005, which claims the benefit of 60/585,629, filed Jul. 6, 2004, the disclosures of which are herein incorporated by reference in their entireties.

FIELD OF THE INVENTION

The present invention relates to processes to produce nanocomposites. In particular, the invention relates to solution processes using organic solvents and mixtures of solvents to produce polymeric nanocomposites.

BACKGROUND OF THE INVENTION

Nanocomposite materials have been the subject of much academic and industrial literature due to a large extent on their ability to impart new properties for a given a material. In particular, polymeric nanocomposite materials have been of considerable interest. As used here, nanocomposites or polymeric nanocomposites are typically polymer systems containing inorganic particles with at least one dimension in the nanometer range of the polymer matrix.

Although much work has been done with nanocomposites, only a few methods have been suggested for producing nanocomposites much less a method that would lend itself to producing nanocomposites on a commercial scale such as through in situ production. For example, melt blending has been a method of choice in the art. See e.g., U.S. Pat. Nos. 5,807,629, 6,060,549, WO 02/100935, and WO 02/100936.

In other areas, aqueous solutions are used to produce coatings comprising, inter alia, an elastomer and a dispersed exfoliated layered filler. See e.g., U.S. Pat. No. 6,087,016 and U.S. Patent Application Publication No. 2003/0198767 A1. See also U.S. Pat. No. 5,576,372 (Example 1).

In yet another area, U.S. Pat. No. 6,339,121 discloses, inter alia, a polymer blend composition including a first polymer and a second polymer, which are immiscible, and a compatibilizer. The compatibilizer includes an organoclay, which has been functionalized by an intercalation agent, whereby it has an affinity for each of the polymers. The intercalation agent is a reaction product of a polyamine and an alkyl halide in a polar solvent. The preferred alkyl halides are alkyl chloride and alkyl bromide and the preferred polar solvents are water, toluene, tetrahydro furan, and dimethylformamide.

However, past endeavors have yet to provide for processes to produce polymeric nanocomposites that provide for optimal flexibility in producing a finished product and/or lend themselves to commercial production such as, for example, providing processes that allow for high throughput and/or simplicity in design when combining the reactor system with downstream finishing processes.

BRIEF SUMMARY OF THE INVENTION

The present invention provides for processes to produce nanocomposites. In particular, the invention provides for solution processes using organic solvents and mixtures of solvents to produce polymeric nanocomposites.

In an embodiment, the invention provides for a process to produce a cured nanocomposite composition, the process comprising contacting at least one elastomer and at least one layered filler, and a solution; wherein the cured nanocomposite composition has an oxygen transmission rate of about 150 mm·cc/[m2·day] at 40° C. or less.

In another embodiment, the invention provides for a process to produce a nanocomposite composition, the process comprising contacting at least one elastomer with a solution comprising at least one layered filler.

In yet another embodiment, the invention provides for a process to form a contact product, the process comprising contacting solution (a) comprising at least one hydrocarbon and at least one layered filler with solution (b) comprising at least one solvent and at least one elastomer; and removing the at least one solvent and the at least one hydrocarbon from the contact product.

DETAILED DESCRIPTION OF THE INVENTION

Figure 1:
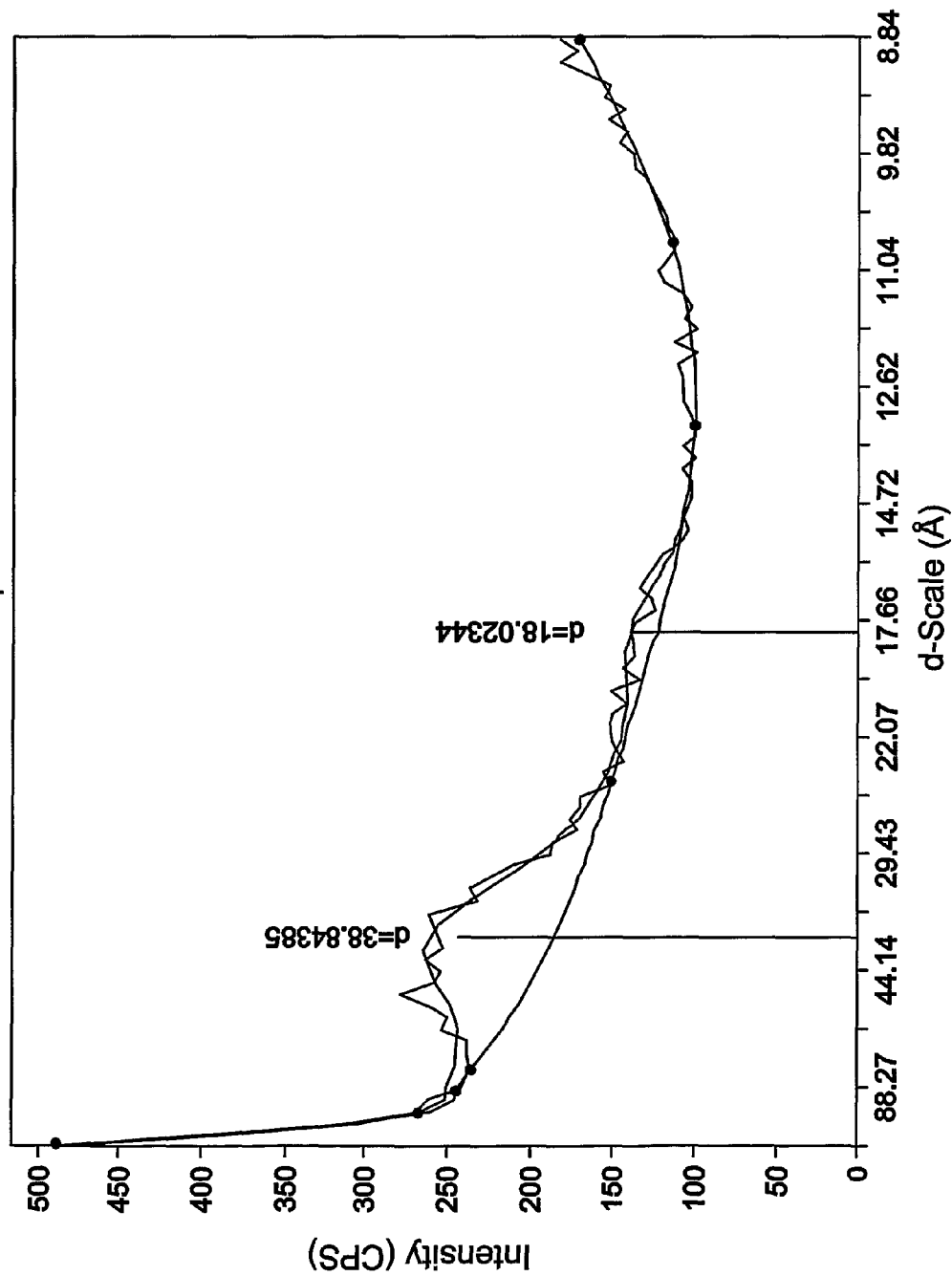
FIGS. 1-6 depict the Small Angle X-ray Scattering (SAXS) diffraction profile of some nanocomposite samples.

Various specific embodiments, versions and examples of the invention will now be described, including preferred embodiments and definitions that are adopted herein for purposes of understanding the claimed invention.

As used herein, the new numbering scheme for the Periodic Table Groups is the new notation as set out CHEMICAL AND ENGINEERING NEWS, 63(5), 27 (1985).

As used herein, a polymer may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, elastomer or elastomeric composition, as used herein, refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber (s)."

As used herein, phr is parts per hundred rubber, and is a measure common in the art wherein components of a composition are measured relative to a major elastomer component, based upon 100 parts by weight of the elastomer(s) or rubber(s).

As used herein, isobutylene based elastomer or polymer refers to elastomers or polymers comprising at least 80 mol % repeat units from isobutylene.

As used herein, isoolefin refers to any olefin monomer having two substitutions on the same carbon.

As used herein, multiolefin refers to any monomer having two or more double bonds, for example, a multiolefin may be any monomer comprising two conjugated double bonds such as a conjugated diene such as isoprene.

As used herein, nanocomposite refers to polymer systems containing inorganic particles with at least one dimension in the nanometer range of the polymer matrix.

As used herein, intercalation refers to the state of a composition in which a polymer is present between each layer of a platelet filler. As is recognized in the industry and by academia, some indicia of intercalation can be the shifting and/or weakening of X-ray lines as compared to that of original platelet fillers, indicating a larger spacing between vermiculite layers than in the original mineral.

As used herein, exfoliation refers to the complete separation of individual layers of the original particle, so that polymer completely surrounds each particle. In an embodiment, so much polymer is present between each platelet, that the platelets are randomly spaced. For example, some indication of exfoliation may be a plot showing no X-ray lines because of the random spacing of exfoliated platelets as discussed in more detail below. However, as recognized in the industry and by academia, other indicia should be considered to determine the results of exfoliation such as permeability testing.

As used herein, solvent refers to any substance capable of dissolving another substance. When the term solvent is used it may refer to at least one solvent or two or more solvents unless specified. In certain embodiments, the solvent is polar; in other embodiments, the solvent is non-polar.

As used herein, solution refers to a uniformly dispersed mixture at the molecular level or ionic level, of one or more substances (solute) in one or more substances (solvent). A solution process refers to a mixing process that both elastomer and layered filler remain uniformly in a single phase of organic solvents or solvent mixtures.

As used herein, hydrocarbon refers to molecules or segments of molecules containing primarily hydrogen and carbon atoms. In some embodiments, hydrocarbon also includes halogenated versions of hydrocarbons and versions containing herteroatoms as discussed in more detail below.

Permeability testing proceeded according to the following description. All examples were compression molded with slow cooling to provide defect free pads. A compression and curing press was used for rubber samples. Typical thickness of a compression molded pad is around. 0.38 mm using an Arbor press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et. al. in 8 JOURNAL OF POLYMER SCIENCE: PART A-2 467 (1970). Disks thus prepared were mounted on a template and sealed with a vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen gas permeability.

X-Ray testing proceeded according to the following description. X-ray data was collected on two different goniometer configurations. A D/MAX Rapid 2-dimensional detector microdiffraction system, with SAXS beam stop and point source was used for one set of data, and an Ultima III line source system with SAXS attachment in parallel beam mode was used for the second set of data. The intensity versus d-spacing plots shown in FIGS. 1-6 are from the parallel beam point source with SAXS attachment instrument. For this data, the sample was prepared by cutting various sections at different angles with respect to the sample surface in order to decrease effects of preferred orientation, and the parallel beam was used to illuminate the entire sample area. For more information on conducting these and related procedures, please consult the manufacture and operating manual related to the aforementioned equipment.

Elastomer

The nanocomposites of the present invention may comprise at least one elastomer along with other components described and claimed herein. In an embodiment, the elastomer may be an interpolymer. The interpolymer may be random elastomeric copolymers of a $C_4$ to $C_7$ isomonoolefins, such as isobutylene and a para-alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the interpolymer may be a random elastomeric copolymer of ethylene or a $C_3$ to $C_6$ α-olefin and a para-alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as interpolymers containing the following monomer units randomly spaced along the polymer chain:

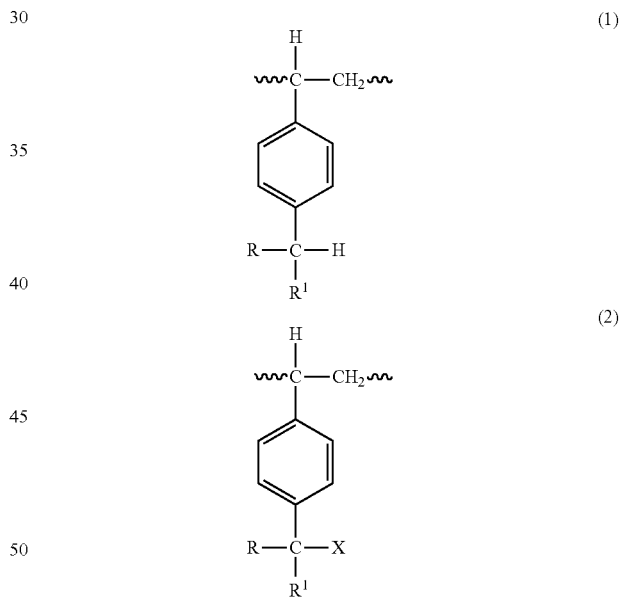

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether;

xanthate; cyamide; cyanate; amino and mixtures thereof. These functionalized isomonoolefin copolymers, their method of preparation, methods of functionalization, and cure are more particularly disclosed in U.S. Pat. No. 5,162,445.

In an embodiment, functionalized materials are elastomeric random interpolymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, these functionalized interpolymers have a substantially homogeneous compositional distribution such that at least 95% by weight of the polymer has a para-alkylstyrene content within 10% of the average para-alkylstyrene content of the polymer. Exemplary interpolymers are characterized by a narrow molecular weight distribution (Mw/n) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography.

The interpolymers may be prepared by a slurry polymerization, typically in a diluent comprising a halogenated hydrocarbon(s) such as a chlorinated hydrocarbon and/or a fluorinated hydrocarbon including mixtures thereof, of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

In an embodiment, brominated poly(isobutylene-co-p-methylstyrene) "BIMS" polymers generally contain from 0.1 to 5% mole of bromomethylstyrene groups relative to the total amount of monomer derived units in the polymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mol % based on the total number of para-methylstyrene, and wherein the para-methylstyrene derived units are present from 3 wt % to 15 wt % based on the total weight of the polymer in one embodiment, and from 4 wt % to 10 wt % in another embodiment. In another embodiment, the para-(halomethylstyrene) is para-(bromomethylstyrene).

In yet another embodiment, the elastomer may comprise a halogenated butyl rubber component, either with the interpolymer or as the only elastomer combined with the exfoliated clay. In one embodiment of the invention, the halogenated rubber component is a halogenated copolymer of a $C_4$ to $C_6$ isoolefin and a multiolefin. In another embodiment, the halogenated rubber component is a blend of a polydiene or block copolymer, and a copolymer of a $C_4$ to $C_6$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. No. 4,074,035 and U.S. Pat. No. 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment, the elastomer comprises a halogenated butyl rubber. As used herein, "halogenated butyl rubber" refers to both butyl rubber and so-called "star-branched" butyl rubber, described below. The halogenated butyl rubber is produced from the halogenation of butyl rubber. For example, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 to 99.5 wt % by weight of the total comonomer mixture in one embodiment, and 85 to 99.5 wt % in another embodiment. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene.

The isoolefin is a $C_4$ to $C_6$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 wt % of isobutylene with 0.5 to 8 wt % isoprene, or reacting 95 to 99.5 wt % isobutylene with from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.2 wt %.

In another embodiment, the halogenated butyl or star-branched butyl rubber may be halogenated such that the halogenation is in the primary allylic position. This is typically achieved by such means as free radical bromination or free radical chlorination, or by such methods as secondary treatment halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963; 4,649,178; and 4,703,091. Thus, in one embodiment of the invention, the halogenated butyl rubber is such that the halogenated multiolefin units are primary allylic halogenated units, and wherein the primary allylic configuration is present to at least 20 mol % (relative to the total amount of halogenated multiolefin) in one embodiment, and at least 30 mol % in another embodiment. This arrangement can be described as follows (3), wherein X is a halogen, desirably chlorine or bromine, and q is at least 25 mol % based on the total moles of halogen in one embodiment, and at least 30 mole % in another embodiment, and from 25 mol % to 90 mol % in yet another embodiment:

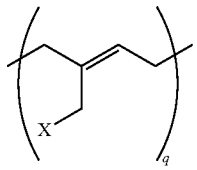

(3)

A commercial embodiment of the halogenated butyl rubber of the present invention is Bromobutyl 2222 (ExxonMobil Chemical Company, Baytown, Tex.). Its Mooney Viscosity is from 27 to 37 (ML 1+8 at 125° C., ASTM 1646), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 wt %. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components or to the characterization described above.

In another embodiment, the elastomer may comprise a branched or "star-branched" halogenated butyl rubber. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. In certain embodiments, these polydienes are present, based on the amount of monomer present in the polymer, greater than 0.3 wt % in one embodiment, and from 0.3 to 3 wt % in another embodiment, and from 0.4 to 2.7 wt % in yet another embodiment.

A commercial embodiment of the SBHR of the present invention is Bromobutyl 6222 (ExxonMobil Chemical Company, Baytown, Tex.), having a Mooney Viscosity (ML 1+8 at 125° C., ASTM 1646, modified) of from 27 to 37, and a bromine content of from 2.2 to 2.6 wt % relative to the SBHR. Further, cure characteristics of Bromobutyl 6222 are as follows: MH is from 24 to 38 dN·m, ML is from 6 to 16 dN·m (ASTM D2084, modified).

In certain embodiments, the halogenated rubber component is present in a blend of from 10 to 90 phr in one embodiment, from 20 to 80 phr in another embodiment, and from 30 to 70 phr in yet another embodiment, wherein a desirable range may be any combination of any upper phr limit with any lower phr limit.

The aforementioned polymers are commonly referred to as isobutylene-based polymers. In certain embodiments, the elastomer comprises an isobutylene-based polymer. Some of the elastomers below are also isobutylene-based polymers according the definition provided herein.

In another embodiment, the elastomer may also comprise natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

In another embodiment, the elastomer may also comprise a natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

In another embodiment, the elastomer may also comprise a polybutadiene (BR) rubber. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). An example is high cis-polybutadiene (cis-BR). By "cis-polybutadiene" or "high cis-polybutadiene", it is meant that 1,4-cis polybutadiene is used, wherein the amount of cis component is at least 95%. A particular example of high cis-polybutadiene commercial products used in the composition BUDENE™ 1207.

In another embodiment, the elastomer may also comprise rubbers of ethylene and propylene derived units such as EPM and EPDM are also suitable as additional rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Baytown, Tex.).

In another embodiment, the elastomer may also comprise a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

In another embodiment, the elastomer may also comprise at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In another embodiment, the elastomer may comprise a so called semi-crystalline copolymer ("SCC"). Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The elastomer may be present in the nanocomposite in a range from up to 90 phr in one embodiment, from up to 50 phr in another embodiment, from up to 40 phr in another embodiment, and from up to 30 phr in yet another embodiment. In yet another embodiment, the elastomer may be present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit.

For example, the elastomer, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

The polymer component of the nanocomposites of the present invention may comprises at least one elastomer as described in any of the above elastomers or may comprise any combination of at least two or more of the elastomers described above. In an embodiment, the elastomer comprises an at least one isobutylene-based polymer. In another embodiment, the elastomer comprises at least one isobutylene-based polymer and at least one other rubber. In yet another embodiment, the elastomer comprises at least two or more isobutylene-based polymers.

Layered Filler

Nanocomposites may include at least one elastomer rubber as described above and at least one layered filler. The layered filler may comprise a layered clay, optionally, treated or pretreated with organic molecules.

Layered clays include natural or synthetic phyllosilicates, such as smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite, and the like.

In an embodiment, the layered clay comprises montmorillonite, nontronite, beidellite, volkonskoite, laponite, hectorite, saponite, sauconite, magadite, kenyaite, stevensite, vermiculite, halloysite, aluminate oxides, hydrotalcite, and combinations thereof.

The layered clay may be intercalated and exfoliated by treatment with organic molecules such as swelling or exfoliating agents or additives capable of undergoing ion exchange reactions with the cations present at the interlayer surfaces of the layered silicate. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives include those which can be covalently bonded to the interlayer surfaces. These include polysilanes of the structure —Si($R^5$)$_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 40 phr in one embodiment, and from 0.2 to 20 phr in another embodiment, and from 0.3 to 10 phr in yet another embodiment.

The exfoliating additive may be added to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In certain embodiments, treatment with the swelling agents described above results in intercalation or exfoliation of the layered platelets as a consequence of a reduction of the ionic forces holding the layers together and introduction of molecules between layers which serve to space the layers at distances of greater than 4 Å, alternatively greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

In certain embodiments, the layered filler comprises alkyl ammonium salts-intercalated clay. Commercial products are available as Cloisites produced by Southern Clay Products, Inc. in Gunsalas, Tex. For example, Cloisite Na$^+$, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD. In Tokyo, Japan. For example, SOMASIF™ MAE, SOMASIF™ MEE, SOMASIF™ MPE, SOMASIF™ MTE, SOMASIF™ ME-100, LUCENTITE™ SPN, and LUCENTITE(SWN).

In certain embodiments, the layered filler generally comprise particles containing a plurality of silicate platelets having a thickness of 8-12 Å tightly bound together at interlayer spacings of 4 Å or less, and contain exchangeable cations such as Na$^+$, Ca$^{+2}$, K$^+$ or Mg$^{+2}$ present at the interlayer surfaces.

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment.

Solution Process

The nanocomposites of the present invention may be produced by solution processes. In certain embodiments, the solution process may be included with in situ production of the nanocomposite composition. In an embodiment, the process may comprise contacting at least one elastomer and at least one layered filler, such as the layered filler as described above, in a solution comprising at least one solvent. Methods and equipment for both lab and large-scale production, including batch and continuous processes, are well known in the art.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In an embodiment, the solution comprises at least one hydrocarbon. In another embodiment, the solution consists essentially of at least one hydrocarbon. In yet another embodiment, the solution comprises or consists essentially of two or more hydrocarbons. In other embodiments, the solution may comprise at least one hexane, such as cyclohexane or mixtures of hexanes. Mixtures of hydrocarbons such as mixtures of hexanes are commonly available as lower grade commercial products.

In another embodiment, suitable solvents include one or more nitrated alkanes, including $C_2$ to $C_{22}$ nitrated linear, cyclic or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

Halogenated versions of all of the above may also be used such as chlorinated hydrocarbons, for example, methyl chloride, methylene chloride, ethyl chloride, propyl chloride, butyl chloride, chloroform, and mixtures thereof.

Hydrfluorocarbons may also be used, for example, fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof.

In certain embodiments, unsaturated hydrofluorocarbons may also be used.

In another embodiment, suitable solvents include at least one oxygenate, including $C_1$ to $C_{22}$ alcohols, ketones, ethers, carboxylic acids, esters, and mixtures thereof.

Alcohols include, but not limited to, methanol, ethanol, 1-propanol, 2-propanol, 1-butanol, 2-butanol, 2-methyl-2-propanol, 2-methyl-1-propanol, 1-petanol, 2-petanol, 3-petanol, 2-methyl-1-butanol, 3-methyl-1-butanol, 3-methyl-2-butanol, t-amyl alcohol, 1-hexanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 3-methyl-2-pentanol, 2,3-dimethyl-2-butanol, 3,3-dimethyl-1-butanol, 3,3-dimethyl-2-butanol, 1-heptanol, 2-heptanol, 3-heptanol, 2-methyl-2-hexanol, 2-methyl-3-hexanol, 5-methyl-1-hexanol, 5-methyl-2-hexanol, 2,2-dimethyl-3-pentanol, 2,3-dimethyl-3-pentanol, 2,4-dimethyl-3-pentanol, 4,4-dimethyl-2-pentanol, 3-ethyl-3-petanol, 1-octanol, 2-octanol, 3-octanol, 4-methyl-3-heptanol, 6-methyl-2-heptanol, 2-ethyl-1-hexanol, 2-propyl-1-pentanol, 2,4,4-trimethyl-1-pentanol, and mixtures thereof.

Ketones include, but not limited to acetone, 2-butanone, 2-pentanone, 3-pentanone, 3-methyl-2-butanone, 2-hexanone, 3-hexanone, 2-methyl-3-pentanone, 3-methyl-2-pentanone, 4-methyl-2-pentanone, 2-hepanone, 3-hepanone, 4-hepanone, 2-methyl-3-hexanone, 5-methyl-2-hexanone, 2,4-dimethyl-3-pentanone, 4,4-dimethyl-2-pentanone, 2-octanone, 3-octanone, 2-methyl-3-heptanone, 5-methyl-3-heptanone, and mixtures thereof.

Ethers include, but not limited to, methyl ether, tetrahydrofuran, butyl methyl ether, sec-butyl methyl ether, tert-butyl methyl ether, butyl ethyl ether, isopropyl ether, tert-amyl methyl ether, tert-butyl ethyl ether, 2,2,5,5-tetramethyltetrahydrofuran, and mixtures thereof.

Acids include, but not limited to, acetic acid, propionic acid, butyric acid, isobutyric acid, valeric acid, isovaleric acid, hexanoic acid, 2,2-dimethylbutyric acid, 2-ethylbutyric acid, 2-methylvaleric acid, 3-methylvaleric acid, 4-methylvaleric acid, heptanoic acid, 2-methylhexanoic acid, octanoic acid, 2-ethylhexanoic acid, 2-propylpentanoic acid, and mixtures thereof.

Esters include, but not limited to, methyl acetate, ethyl formate, ethyl acetate, isopropyl formate, methyl propionate, butyl formate, ethyl propionate, isopropyl acetate, propyl acetate methyl butyrate, methyl isobutyrate, butyl acetate, s-butyl acetate, t-butyl acetate, ethyl butyrate, ethyl isobutyrate, methyl trimethylacetate, methyl valerate, amyl acetate, butyl propionate, t-butyl propionate, ethyl isovalerate, ethyl 2-methylbutyrate, ethyl trimethylacetate, ethyl valerate, isopropyl butyrate, methyl caproate, pentyl acetate, propyl butyrate, butyl butyrate, hexyl acetate, isobutyl isobutyrate, ethyl caproate, and mixtures thereof.

In certain embodiments, a nanocomposite is produced by a process comprising contacting Solution A comprising a solvent comprising a hydrocarbon and at least one layered filler; Solution B comprising a solvent and at least one elastomer; and removing the solvents from the contact product of Solution A and Solution B to form a nanocomposite.

In the previous embodiment, the layered filler may be a layered clay treated with organic molecules as described above.

In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In still another embodiment, the invention provides for a process to improve the air impermeability of an elastomer comprising contacting at least one elastomer, at least one layered filler, and a solution to form a nanocomposite; wherein the oxygen transmission rate is lower the 150 mm·cc/[m2·day] at 40° C. as measured on cured nanocomposite compounds as described herein.

Alternatively, the oxygen transmission rate is from lower than 150 mm·cc/[m2·day] at 40° C. as measured on cured nanocomposite compounds as described herein; the oxygen transmission rate is from lower than 140 mm·cc/[m2·day] at 40° C. as measured on cured nanocomposite compounds as described herein; the oxygen transmission rate is from lower than 130 mm·cc/[m2·day] at 40° C. as measured on cured nanocomposite compounds as described herein; the oxygen transmission rate is from lower than 120 mm·cc/[m2·day] at 40° C. as measured on cured nanocomposite compounds as described herein; the oxygen transmission rate is from lower than 110 mm·cc/[m2·day] at 40° C. as measured on cured nanocomposite compounds as described herein; the oxygen transmission rate is from lower than 100 mm·cc/[m2·day] at 40° C. as measured on cured nanocomposite compounds as described herein; OR the oxygen transmission rate is from lower than 90 mm·cc/[m2·day] at 40° C. as measured on cured nanocomposite compounds as described herein.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total weight of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

In the embodiments described above, the solutions are distinguishable from aqueous solutions or are non-aqueous solutions. Aqueous solutions are solutions where water is either the primary or sole solvent. They have been described in, for example, U.S. Pat. No. 6,087,016 and U.S. Patent Application Publication No. 2003/0198767 A1. See also U.S. Pat. No. 5,576,372 (Example 1). However, in certain embodiments, the solutions of the present invention may contain water. In these embodiments, water is inert in the solution such that it is more akin to a contaminant and does not act as a primary solvent for the solution components, i.e., elastomer, layered filler, etc.

The compounds of nanocomposites may be prepared using a polymer/clay nanocomposite materbatch (10×phr MB) that comprises 100 parts of polymer and X parts of clay. For example, the nanocomposite having 8 parts of clay would be used as 108 phr in the compounding formulation. In certain embodiments, a useful formulation for property evaluation would be as follows:

| Material I.D. | Parts |
|---|---|
| Exxpro elastomer | 108.0 |
| Clay MB | (100 parts of rubber and 8 parts of clay) |
| Carbon black N660 | 60.0 |
| Stearic Acid | 1.0 |
| ZnO Kadox 911 | 1.0 |
| MBTS | 1.0 |

Other Components

One or more additional filler components such as, for example, calcium carbonate, silica, clay and other silicates which may or may not be exfoliated, talc, titanium dioxide, and carbon black may also be included. Silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the additional filler is carbon black or modified carbon black, and combinations of any of these. In another embodiment, the additional filler may be a blend of carbon black and silica.

Additional fillers for articles such as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Carbon blacks suitable for innerliners and other air barriers include N550, N660, N650, N762, N990, and Regal 85.

The additional filler may be any size and typically ranging, for example, from about 0.0001 µm to about 100 µm.

One or more crosslinking agents, such as a coupling agent, may also be used, especially when silica is present in combination. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyl-trimethoxysilane, gamma-amino-propyl triethoxysilane (sold commercially as A1100 by Witco), gamma-mercapto-propyltrimethoxysilane (A189 by Witco) and the like, and mixtures thereof. In one embodiment, bis-(3-triethoxysilylpropyl)tetrasulfide (sold commercially as "Si69") is employed.

Generally, polymer blends, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991)). Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-(morpholinothio)benzothiazole (MBS or MOR), blends of 90% MOR and 10% MBTS (MOR90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

The nanocomposite of the invention may also be cured using a curative. In one embodiment, the nanocomposite also comprises a curative selected from sulfur, sulfur-based compounds, metal oxides, metal oxide complexes, fatty acids, peroxides, diamines, and mixtures thereof.

In other embodiments, desirable elastomer impermeability is achieved by the presence of at least one polyfunctional curative. An embodiment of such polyfunctional curatives can be described by the formula Z—$R^7$—Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bisthiosulfate compounds are an example of a class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the nanocomposite from 0.1 to 8 phr in one embodiment, and from 0.2 to 5 phr in yet another embodiment.

A processing aid may also be included. Processing aids include, but are not limited to, plasticizers, tackifiers, extenders, chemical conditioners, homogenizing agents and peptizers such as mercaptans, petroleum and vulcanized vegetable oils, mineral oils, parraffinic oils, polybutene polymers, naphthenic oils, aromatic oils, waxes, resins, rosins, and the like. The aid is typically present from 1 to 70 phr in one embodiment, from 3 to 60 phr in another embodiment, and from 5 to 50 phr in yet another embodiment.

Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil. In one embodiment of the invention, paraffinic, naphthenic and aromatic oils are substantially absent, meaning, they have not been deliberately added to the compositions used to make the air barriers, or, in the alternative, if present, are only present up to 0.2 wt % of the compositions used to make the air barriers. In another embodiment of compositions of the invention, naphthenic and aromatic oils are substantially absent. Commercial examples of these include, for example, FLEXON oils (which contain some aromatic moieties) and CALSOL oils (a naphthenic oil).

In another embodiment, useful plastomers comprise ethylene derived units and from 10 wt % to 30 wt % of $C_3$ to $C_{10}$ α-olefin derived units. In another embodiment, the plastomer comprises ethylene derived units and from 10 wt % to 30 wt % of units selected from 1-butene, 1-hexene and 1-octene derived units. In yet another embodiment, the plastomer comprises ethylene derived units and from 10 wt % to 30 wt % of octene derived units. In an embodiment, the plastomer has a melt index of from 0.1 to 20 dg/min, and from 0.1 to 10 dg/min in another embodiment.

In these embodiments, plastomers may be metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm³ in one embodiment. The molecular weight distribution (Mw/Mn) of desirable plastomers ranges from 2 to 5 in one embodiment, and from 2.2 to 4 in another embodiment. Examples of these commercially available plastomers are EXACT 4150, a copolymer of ethylene and 1-hexene, the 1-hexene derived units making up from 18 to 22 wt % of the plastomer and having a density of 0.895 g/cm³ and MI of 3.5 dg/min (ExxonMobil Chemical Company, Houston, Tex.); and EXACT 8201, a copolymer of ethylene and 1-octene, the 1-octene derived units making up from 26 to 30 wt % of the plastomer, and having a density of 0.882 g/cm³ and MI of 1.0 dg/min (ExxonMobil Chemical Company, Houston, Tex.).

In one embodiment, the plastomer is present in the nanocomposite from 2 to 20 phr, and from 10 to 15 phr in another embodiment.

In another aspect, the nanocomposite may also comprise a processing oil or aid. The oil is selected from parraffinic oils and polybutene processing oils, and mixtures thereof in one embodiment, and is a polybutene oil in another embodiment. The processing oil is present from 2 to 20 phr in one embodiment, and from 5 to 18 phr in another embodiment. Rosin oils may be present in compositions of the invention from 0.1 to 5 phr in one embodiment, and from 0.2 to 2 phr in another embodiment. Desirably, oils and processing aids comprising unsaturation comprise less than 2 phr of the compositions of the invention in one embodiment.

The nanocomposites produced in accordance with the present invention may also contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, diamines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used. The components, and other curatives, are typically present from 0.1 to 10 phr in the composition.

In another embodiment, the nanocomposite may also comprise at least one other rubber selected from natural rubbers, polyisoprene rubber, styrene-butadiene rubber (SBR), polybutadiene rubber, isoprene-butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, poly(isobutylene-co-p-methylstyrene), halogenated poly(isobutylene-co-p-methylstyrene), poly(isobutylene-co-cyclopentadiene), halogenated poly(isobutylene-co-cyclopentadiene), and mixtures thereof. In another embodiment, the composition also comprises from 5 to 30 phr of a natural rubber.

In any of the embodiments described herein unless otherwise specified, the elastomer, the nanocomposite composition, and/or the contact product may be free of functionalized amine(s) such as those disclosed, for example, in WO 02/100935. In other words, the elastomer, the nanocomposite composition, and/or the contact product may be employed in the practice of the invention with the proviso that no functionalized amine(s) such as those disclosed, for example, in WO 02/100935 are present.

INDUSTRIAL APPLICABILITY

The nanocomposites of the invention may be extruded, compression molded, blow molded, injection molded, and laminated into various shaped articles including fibers, films, layers, industrial parts such as automotive parts, appliance housings, consumer products, packaging, and the like.

In particular, the nanocomposites are useful as in articles such as truck tires, bus tires, passenger automobile tires, motorcycle tires, off-road tires, air craft tires, and the like. The nanocomposites may either serve as a material fabricated into a finished article or a component of a finished article. The article may be selected from air barriers, air membranes, films, layers (microlayers and/or multilayers), innerliners, innertubes, treads, bladders, and sidewalls.

EXAMPLES

Example 1

100 g of Exxpro™ elastomer (brominated poly(isobutylene-co-p-methylstyrene) ("BIMS) available from Exxon-Mobil Chemical Company, Houston, Tex.) (MDX 01-5 having 10 wt % of para-methylstyrene ("PMS"), 0.85 mol % BrPMS)) was dissolved in 1200 mL of cyclohexane in a 2-L reactor. The polymer cement was heated to 75° C., and Cloisite 6A clay (5.0 g, mixed with 100 mL of cyclohexane) was added. The mixing was kept at 75° C. for 3 hours. The product was precipitated by adding 2000 mL of isopropyl alcohol to the polymer cement. The resulting polymer/clay nanocomposite was dried in a vacuum oven at 60° C. for 24 hours.

Example 2

100 g of Exxpro™ elastomer (MDX 01-5: 10 wt % of PMS, 0.85 mol % BrPMS) was dissolved in 1200 mL of cyclohexane in a 2-L reactor. The polymer cement was heated to 75° C., and Cloisite 6A clay (4.0 g, mixed with 100 mL of cyclohexane) was added. The mixing was kept at 75° C. for 3 hours. The product was precipitated by adding 2000 mL of isopropyl alcohol to the polymer cement. The resulting polymer/clay nanocomposite was dried in a vacuum oven at 60° C. for 24 hours.

Example 3

100 g of Exxpro™ elastomer (MDX 01-5: 10 wt % of PMS, 0.85 mol % BrPMS) was dissolved in 1200 mL of cyclohexane in a 2-L reactor. The polymer cement was heated to 75° C. Bis(2-hydroxylethyl)cocoalkyl amine (3.0 g, Ethomeen C/12 from Akzo Nobel), and Cloisite 6A clay (5.0 g) were mixed with cyclohexane (100 mL) and added to the reactor. The reaction was kept at 75° C. for 3 hours. The product was precipitated by adding 2000 mL of isopropyl alcohol to the polymer cement. The resulting polymer/clay nanocomposite was dried in a vacuum oven at 60° C. for 24 hours.

Example 4

A 100-Gallon glass-lined reactor was charged with 35 lbs of Exxpro™ elastomer (MDX 01-5: 10 wt % of PMS, 0.85 mol % BrPMS), and 280 lbs of cyclohexane. The reactor contents were stirred at ambient temperature for 24 hours until the polymer was dissolved. Bis(2-hydroxylethyl)cocoalkyl amine (160 g, Ethomeen C/12 from Akzo Nobel), and Cloisite 6A clay (635 g) were mixed with cyclohexane (2000 mL) and then added to the reactor. The temperature was raised to 75° C., and the reaction was kept at 75° C. for 2 hours. After 2 hours, the reactor was cooled down to ambient temperature. The polymer cement was transferred to a steam stripper, and solvent was removed by steam stripping. The resulting polymer was dried using a dewatering expeller and a drying extruder.

Example 5

A 2-L reactor was charged with toluene (1200 mL) and clay (Cloisite 20A clay, 12 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and kept at 70° C. for 2 hours. The product was collected in a large pan. The solvent was evaporated in a hood and the resulting polymer/clay nanocomposite was dried in a vacuum oven at 70° C. for 24 hours.

Example 6

A 2-L reactor was charged with toluene (1200 mL) and clay (Cloisite 20A clay, 12 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and dimethylhexyl amine (0.075 g) was added. The reaction was kept at 70° C. for 2 hours. The product was collected in a large pan. The solvent was evaporated in a hood and the resulting polymer/clay nanocomposite was dried in a vacuum oven at 70° C. for 24 hours.

Example 7

A 2-L reactor was charged with toluene (1200 mL) and clay (Cloisite 20A clay, 12 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and dimethylhexyl amine (0.15 g) was added. The reaction was kept at 70° C. for 2 hours. The product was collected in a large pan. The solvent was evaporated in a hood and the resulting polymer/clay nanocomposite was dried in a vacuum oven at 70° C. for 24 hours.

Example 8

A 2-L reactor was charged with toluene (1200 mL) and clay (Cloisite 20A clay, 6 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and kept at 70° C. for 2 hours. The product was collected in a large pan. The solvent was evaporated in a hood and the resulting polymer/clay nanocomposite was dried in a vacuum oven at 70° C. for 24 hours.

Example 9

A 2-L reactor was charged with toluene (1200 mL) and clay (Cloisite 20A clay, 6 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and dimethylhexyl amine (0.075 g) was added. The reaction was kept at 70° C. for 2 hours. The product was collected in a large pan. The solvent was evaporated in a hood and the resulting polymer/clay nanocomposite was dried in a vacuum oven at 70° C. for 24 hours.

Example 10

A 2-L reactor was charged with toluene (1200 mL) and clay (Cloisite 20A clay, 6 g). When clay was well dispersed in the solvent, 150 g of Exxpro™ elastomer (MDX 03-1: 10 wt % of PMS, 0.86 mol % BrPMS) was added to the reactor with stirring. After polymer was dissolved, the cement was heated to 70° C., and dimethylhexyl amine (0.15 g) was added. The reaction was kept at 70° C. for 2 hours. The product was collected in a large pan. The solvent was evaporated in a hood and the resulting polymer/clay nanocomposite was dried in a vacuum oven at 70° C. for 24 hours.

Example 11

A 100-Gallon glass-lined reactor was charged with 45 lbs of Exxpro™ elastomer (MDX 03-1: 10 wt % of PMS, 0.86 mol % BrPMS), 1650 g of clay (SOMASIF-MAE clay from CO-OP Chemical Co., LTD., Tokyo, Japan) and 350 lbs of cyclohexane. The reactor contents were stirred at ambient temperature for 48 hours until the polymer was dissolved and clay was well dispersed. N,N-dimeylhexyl amine (40 g, from Aldrich) was added to the reactor. The temperature was raised to 75° C., and the reaction was kept at 75° C. for 2 hours. After 2 hours, the reactor was cooled down to ambient temperature. The polymer cement was transferred to a steam stripper, and solvent was removed by steam stripping. The resulting polymer was dried using a dewatering expeller and a drying extruder.

TABLE 1

Characterization and Permeability[1]

Figure 2:
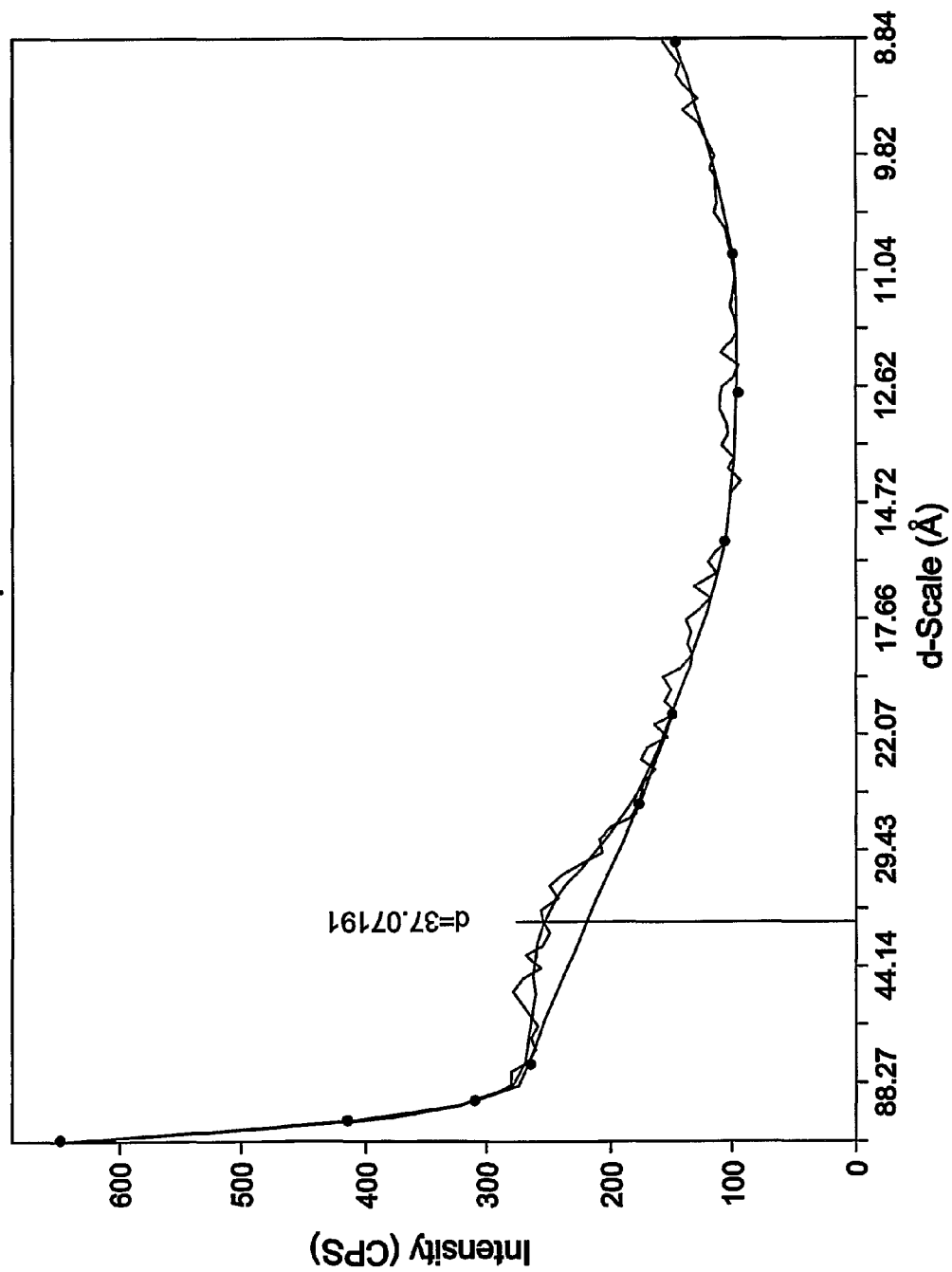
Figure 3:
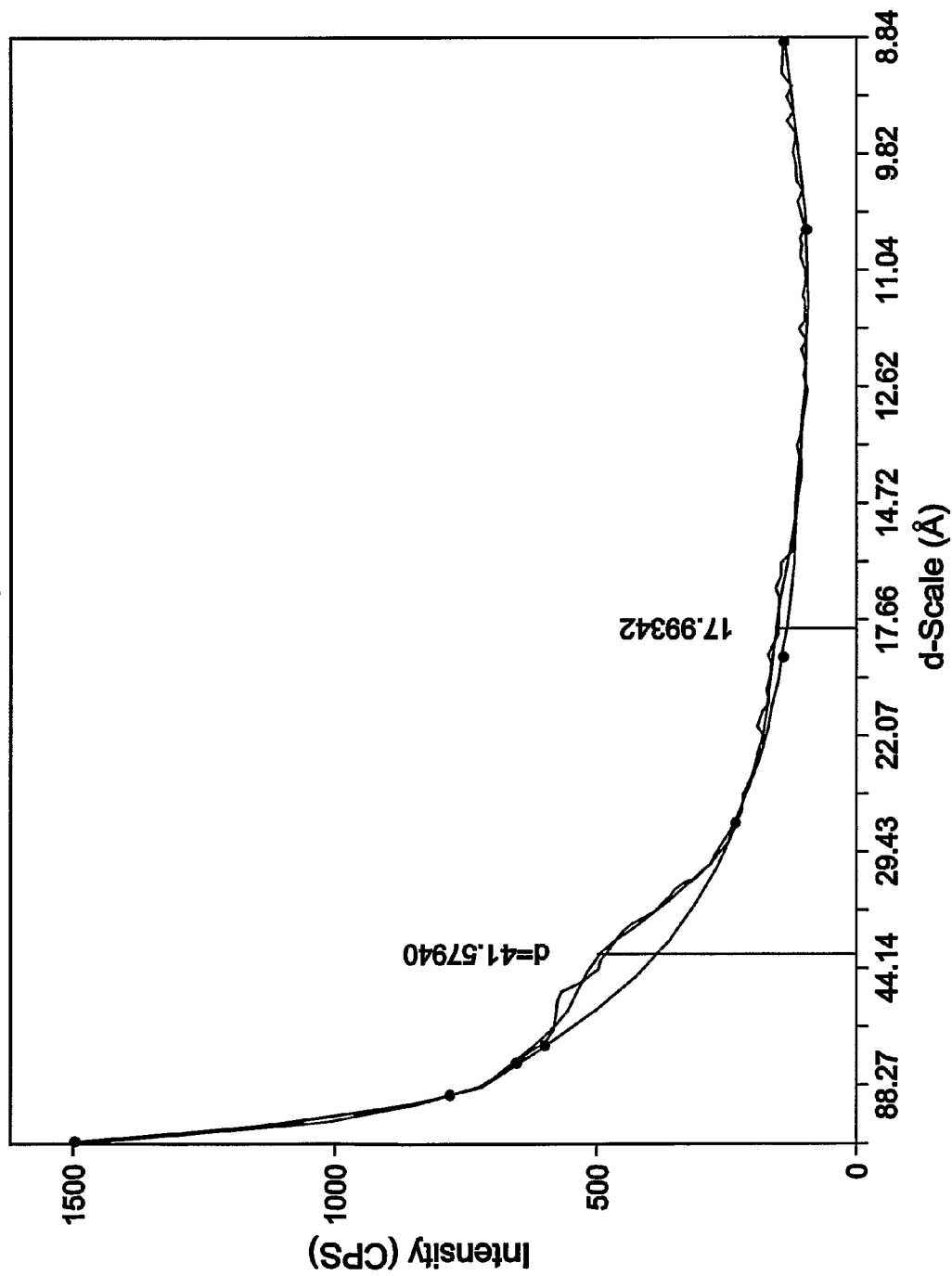
Figure 4:
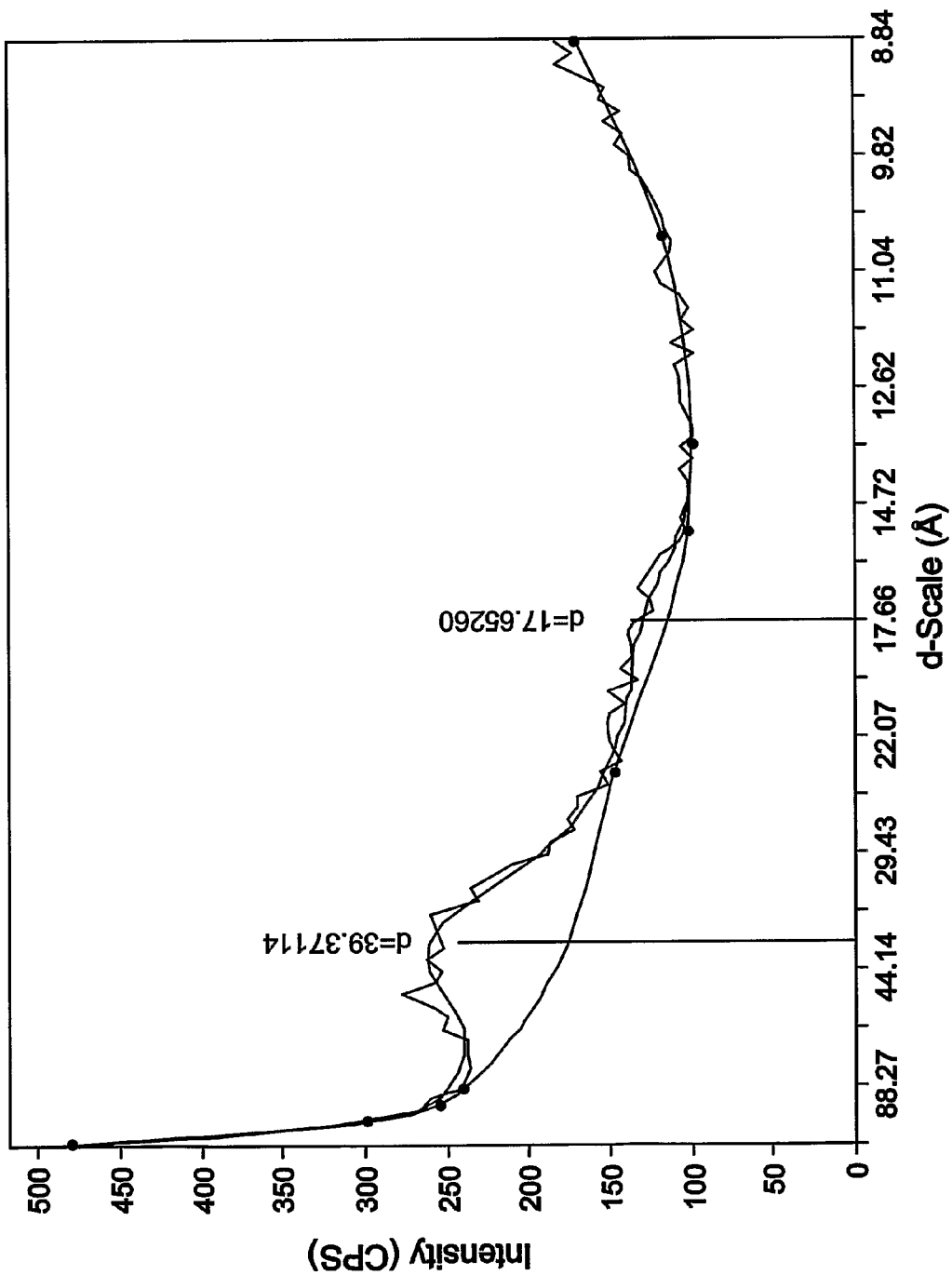
Figure 5:
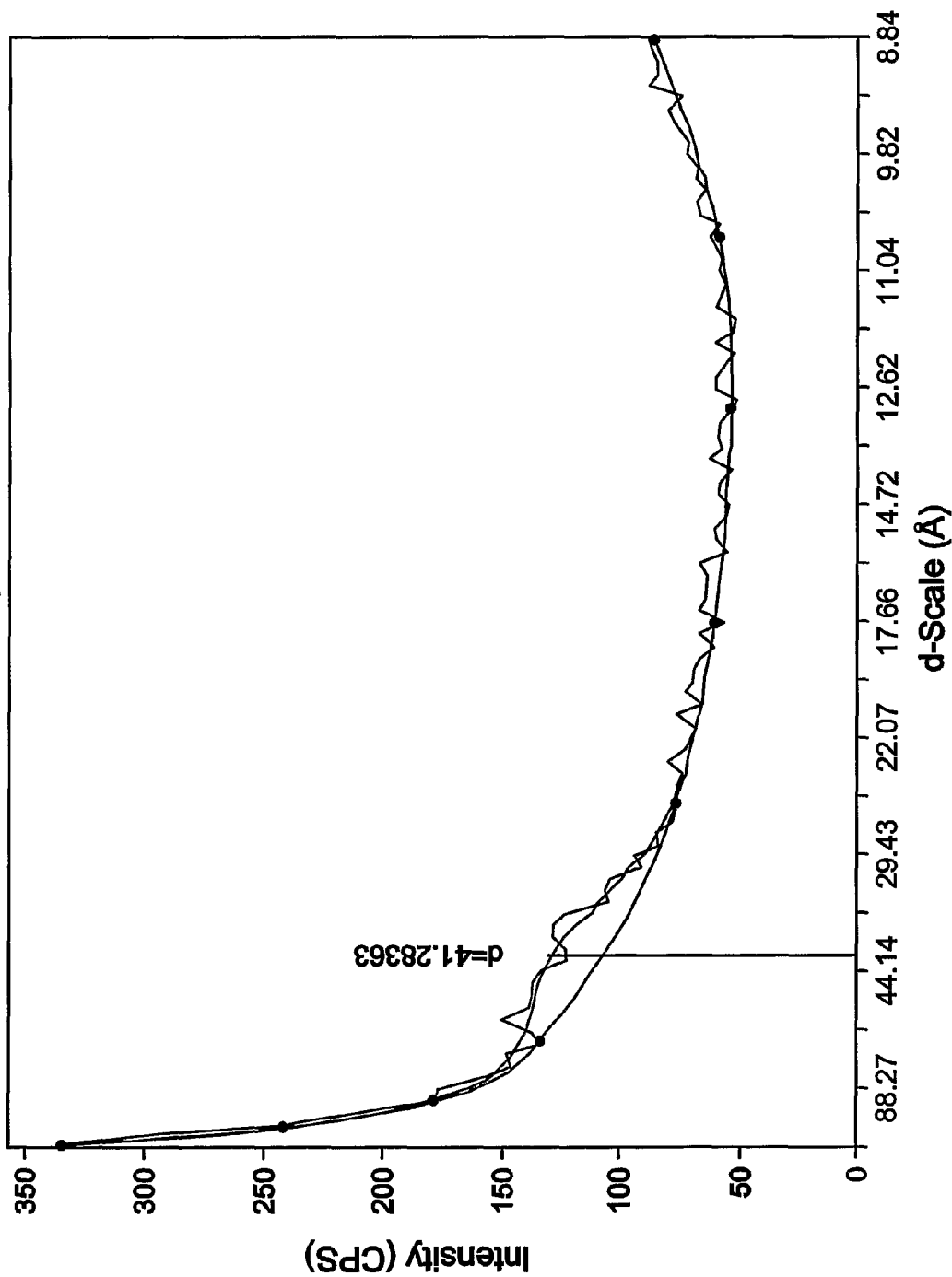
Figure 6:
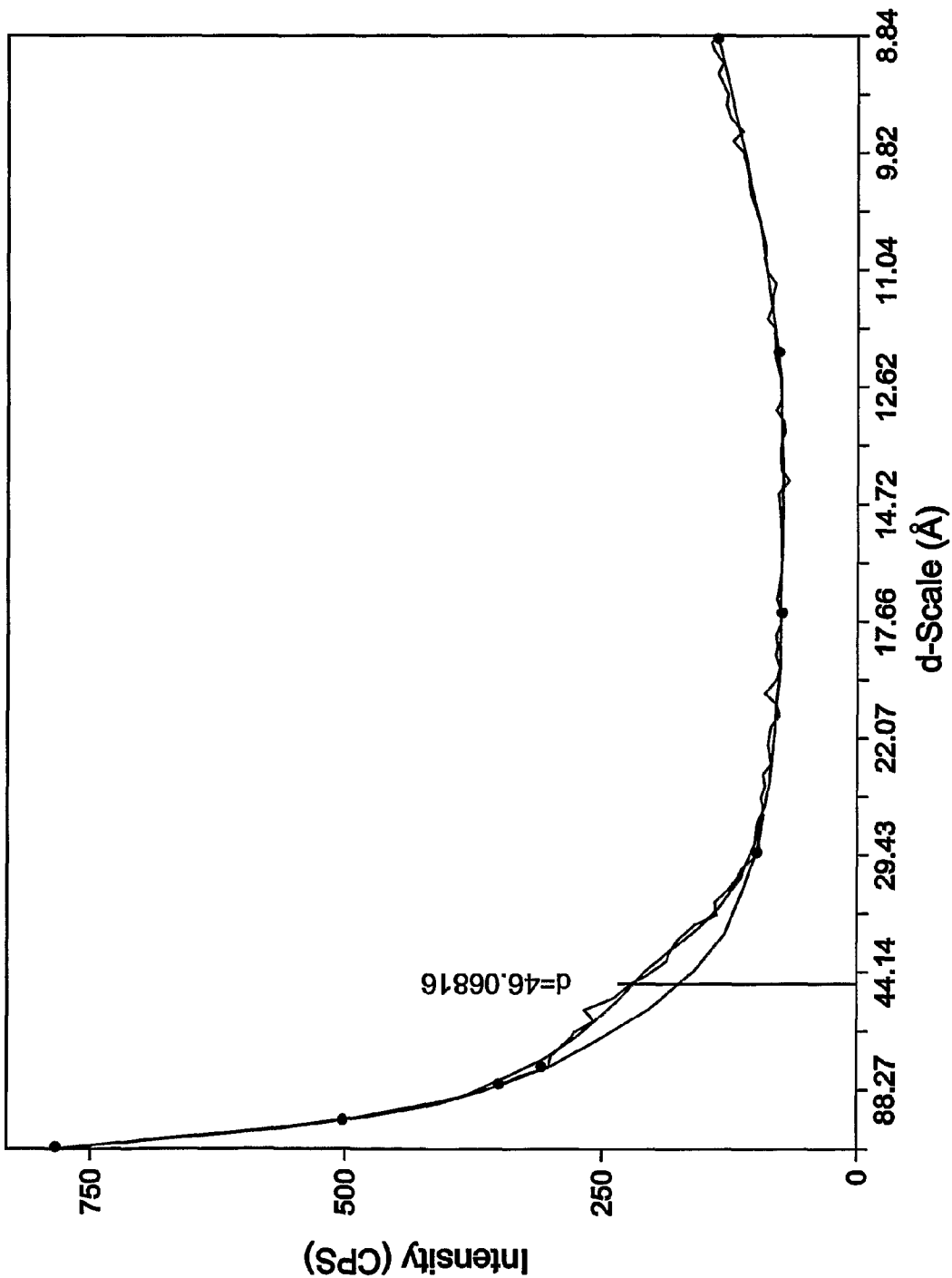

| Example | Permeation Rate* (mm · cc/ [$m^2$ · day] at 40° C.) | | X-ray |
|---|---|---|---|
| Example 1 | 118.8 | 121.9 | |
| Example 2 | 136.8 | 138.9 | |
| Example 3 | 125.2 | 120.3 | |
| Example 4 | 154.5 | 163.8 | |
| Example 5 | 109.9 | 108.3 | FIG. 1 |
| Example 6 | 108.2 | 105.1 | FIG. 2 |
| Example 7 | 101.4 | 102.9 | FIG. 3 |
| Example 8 | 109.5 | 109.3 | FIG. 4 |
| Example 9 | 108.4 | 105.9 | FIG. 5 |
| Example 10 | 103.2 | 100.2 | FIG. 6 |
| Example 11 | 105.2 | 102.8 | |
| Example 12 | 186.6 | 185.9 | |

[1]Permeation is reported for fully compounded material. Such compounds are prepared by mixing dried polymer/clay composite with carbon black curatives via Brabender. They are cured by pressing at high temperature.

Example 12-17

General Procedure

Step 1: Clay (6.4 grams) and 10 grams of rubber were dissolved in Cyclohexane (100 mL) for 6 hours at room temperature. Step 2: 70 grams of rubber were dissolved in 500 mL of Cyclohexane in a container. The solution was transferred into a glass reactor at 50° C. The container washed with 100 mL of Cyclohexane and the solution from washing was also added to the reactor. After stirring the mixture for 5 minutes, the clay mixture from step 1 was added to the reactor. After stirring the mixture for 30 minutes, the mixture was poured out, air-dried (overnight) and then dried for 3 hrs under vacuum at 70 C and milled for 10-15 minutes at 130° C.

For example 12, rubber was Exxpro™ elastomer (MDX 03-1) and Clay is Cloisite 25A.

For example 13, rubber was Exxpro™ elastomer (MDX 03-1) and Clay is Cloisite 6A.

For example 14, rubber was BIIR elastomer (BIIR2222) and Clay is Cloisite 25A.

For example 15, rubber was BIIR elastomer (BIIR2222) and Clay is Cloisite 6A.

For example 16, rubber was BIIR elastomer (BIIR6222) and Clay is Cloisite 25A.

For example 17, rubber was BIIR elastomer (BIIR6222) and clay is Cloisite 6A.

Example 18-22

General procedure

Step 1: Rubber (80 grams) was dissolved in 800 mL of Xylene at 100° C. To the solution was added clay (6.4 grams) and 50 mL of ethyl alcohol. Then the solution was stirred for 2 hrs at 70° C. After cooling down, the product was poured out and solvent was evaporated. The product was further dried under vacuum for overnight at 70° C. for 5 hrs and milled for 15 minutes at 130° C.

For example 18, rubber is Exxpro™ elastomer (MDX 03-1) and clay is Cloisite 6A.

For example 19, rubber is Exxpro™ elastomer (MDX 03-1) and clay is Cloisite 10A.

For example 20, rubber is Exxpro™ elastomer (MDX 03-1) and clay is Cloisite 15A.

For example 21, rubber is Exxpro™ elastomer (MDX 03-1) and clay is Cloisite 20A.

For example 22, rubber is Exxpro™ elastomer (MDX 03-1) and clay is Cloisite 30B.

Example 23-25

General Procedure

Step 1: Exxpro™ elastomer (MDX 03-1) (80 grams) was added to a reactor containing in 800 mL of Xylene at 70° C. To the solution was added clay and ethyl alcohol while stirring. Then the solution was rapidly stirred for 4 hrs. After cooling down, the product was poured out and the solvent was evaporated. Product was dried under vacuum for overnight at 90° C. and milled for 15 minutes at 130° C.

For example 23, Volume of ethyl alcohol is 50 mL, clay is Cloisite 30B.

For example 24, Volume of ethyl alcohol is 75 mL, clay is Cloisite 30B

For example 25, Volume of ethyl alcohol is 50 mL, clay is Cloisite 25A.

TABLE 2

| Example | Permeability[2] Permeation rate at 40° C. | |
|---|---|---|
| Example 12 | 96.3 | 92.7 |
| Example 13 | 104.8 | 104.6 |
| Example 14 | 107.1 | 114.3 |
| Example 15 | 124.4 | 122.1 |
| Example 16 | 109.1 | 115.3 |
| Example 17 | 132.1 | 130.4 |
| Example 18 | 103.0 | 110.4 |
| Example 19 | 97.4 | 104.3 |
| Example 20 | 107.3 | 112.6 |
| Example 21 | 103.3 | 105.2 |
| Example 22 | 100.3 | 95.9 |
| Example 23 | 91.1 | 92.7 |
| Example 24 | 95.9 | — |
| Example 25 | 93.7 | 93.4 |

[2]Permeation is reported for fully compounded material. Such compounds are prepared by mixing dried polymer/clay composite with carbon black curatives via Brabender. They are cured by pressing at high temperature.

All patents and patent applications, test procedures (such as ASTM methods), and other documents cited herein are fully incorporated by reference to the extent such disclosure is consistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. A process to form a nanocomposite, the process comprising contacting a non-aqueous solution (a) consisting essentially of at least one hydrocarbon and at least one layered filler with a non-aqueous solution (b) consisting essentially of at least one solvent and at least one isobutylene based elastomer having a viscosity average molecular weight in the range of from 200,000 up to 2,000,000, where the solvent in solution (b) is selected from the group consisting of at least one hydrocarbon, at least one nitrated alkane, at least one hydrofluorocarbon, at least one oxygenate, at least one alcohol, at least one ketone, at least one ether, at least one carboxylic acid, at least one ester, and a mixture thereof; and removing the at least one solvent and the at least one hydrocarbon to recover a nanocomposite containing 1 to 30 phr of filler.

2. The process of claim 1, wherein each of the at least one hydrocarbons independently comprise propane, sobutene, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, or mixtures thereof.

3. The process of claim 1, wherein the solution (b) contains from about 30 to about 99 wt % of the at least one solvent based upon the total weight of the solution (b).

4. The process of claim 1, wherein the at least one solvent of solution (b) is two or more solvents.

5. The process of claim 1, wherein the isobutylene based elastomer is a copolymer of isobutylene and an alkylstyrene.

6. The process of claim 5, wherein the copolymer is a halogenated copolymer.

7. The process of claim 1, wherein the isobutylene based elastomer is a copolymer of isobutylene and isoprene.

8. The process of claim 7, wherein the copolymer is a halogenated copolymer.

9. The process of claim 1, wherein the isobutylene based elastomer is a homopolymer of isobutylene.

10. The process of claim 1, wherein the at least one layered filler comprises an intercalated clay, an exfoliated clay, or a mixture thereof.

11. The process of claim 1, wherein the recovered nanocomposite is further blended with an additional filler, a secondary elastomer, a curative, a crosslinking agent, an accelerator, a processing aid, or any combination thereof.

12. The process of claim 1, wherein the recovered nanocomposite is free of functionalized amine.

13. The process of claim 1, wherein the recovered nanocomposite contains 0.5 to 10 weight % layered filler, based on the weight of the recovered nanocomposite.

14. The process of claim 1, wherein the at least one solvent and at least one hydrocarbon is 30 to 99 weight % of the total weight of non-aqueous solution (a) and non-aqueous solution (b).

15. The process of claim 1, wherein if either the non-aqueous solution (a) or non-aqueous solution (b) contain any water, said water is a contaminant in the solution.

* * * * *